United States Patent [19]

Kritchevsky

[11] Patent Number: 4,469,842

[45] Date of Patent: Sep. 4, 1984

[54] ISOCYANATE-COUPLED REINFORCED OXYMETHYLENE POLYMERS USING IMPROVED CATALYST SYSTEM

[75] Inventor: Gina R. Kritchevsky, Scotch Plains, N.J.

[73] Assignee: Celanese Corporation, New York, N.Y.

[21] Appl. No.: 519,178

[22] Filed: Aug. 1, 1983

[51] Int. Cl.$^3$ ............................................... C08K 3/40
[52] U.S. Cl. .................................... 524/593; 525/399
[58] Field of Search ............... 524/593; 528/230, 260; 525/399, 398

[56] References Cited

U.S. PATENT DOCUMENTS

| | | | |
|---|---|---|---|
| 3,364,157 | 1/1968 | Halek et al. | 260/13 |
| 3,455,867 | 7/1969 | Berardinelli et al. | 260/37 |
| 3,670,050 | 6/1972 | Castner et al. | 260/860 |
| 3,697,624 | 10/1972 | Braunstein | 260/860 |
| 3,766,298 | 10/1973 | McAndrew | 260/858 |
| 3,850,873 | 11/1974 | Wurmb et al. | 260/37 AL |
| 3,963,668 | 6/1976 | Wurmb et al. | 260/37 AL |

FOREIGN PATENT DOCUMENTS 1069752  5/1964  United Kingdom .

*Primary Examiner*—Lewis T. Jacobs
*Attorney, Agent, or Firm*—Herbert P. Price

[57] ABSTRACT

An improved oxymethylene polymer composition is provided which is comprised of a blocked or unblocked isocyanate, a synergistic blend of isocyanate catalysts consisting of dibutyl tin dilaurate and at least one alkyl dimethyl benzyl ammonium saccharinate (as defined) and a reinforcing agent. The presence of the blend of isocyanate catalysts enables satisfactory coupling to be achieved between the reinforcing agent and the oxymethylene polymer with a smaller amount of isocyanate coupling agent than would normally be required. In addition, a lessened amount of catalyst is required to achieve such a result.

15 Claims, No Drawings

ISOCYANATE-COUPLED REINFORCED OXYMETHYLENE POLYMERS USING IMPROVED CATALYST SYSTEM

REFERENCE TO RELATED APPLICATION

The application is related to application Ser. No. 533,077, filed Sept. 19, 1983, of Kavilipalayam Natarajan and Daniel Zimmerman entitled "Isocyanate-Coupled Reinforce Oxymethylene Polymer."

BACKGROUND OF THE PRESENT INVENTION

The present invention is directed to reinforced oxymethylene polymer compositions.

Oxymethylene polymer molding compositions have been employed for many years. In order to enhance the mechanical properties of such compositions, various reinforcing agents such as glass fibers have been employed. Various isocyanate coupling agents have also been employed in such compositions to provide greater adhesion between the polymer and the reinforcing agent. See, in this regard, commonly-assigned U.S. Pat. No. 3,455,867.

However, the use of isocyanate coupling agents in molding compositions has not been always desirable from an environmental viewpoint since free isocyanate is disadvantageously released during processing. It is thus desirable to provide a mechanism for use of the isocyanate coupling agent while minimizing environmental isocyanate.

It is also desirable to provide a mechanism for the use of the isocyanate coupling agent which enables the desired degree of coupling to occur while employing lesser amounts of the isocyanate.

OBJECTS AND SUMMARY OF THE INVENTION

It is therefore an object of the present invention to provide an improved oxymethylene molding composition which employs reduced amounts of isocyanate coupling agents.

It is also an object of the present invention to employ an isocyanate coupling agent in an oxymethylene molding composition which is less prone to cause environmental contamination.

It is further an object of the present invention to provide an improved oxymethylene molding composition which employs reduced amounts of isocyanate catalysts.

In accordance with the present invention, there is thus provided a molding composition comprised of an oxymethylene polymer having at least 60 percent of recurring oxymethylene units, an isocyanate compound in an amount ranging from about 0.25 to 1.5 percent by weight based on the weight of the polymer, a reinforcing agent in the form of glass fibers and a catalyst in an amount ranging from about 0.15 to 2.5 percent by weight based on the weight of the isocyanate, said catalyst comprised of an admixture of dibutyl tin dilaurate and at least one alkyl dimethyl benzyl ammonium saccharinate wherein alkyl is selected from the group consisting of $C_{12}$-$C_{18}$ and mixtures thereof, with said dibutyl tin dilaurate and said at least one alkyl dimethyl benzyl ammonium saccharinate being present in a weight ratio ranging from about 0.1:1 to 1:1, respectively.

DETAILED DESCRIPTION OF THE INVENTION

It has been surprisingly discovered that the catalyst system disclosed herein provides highly desirable advantages with respect to the amount of isocyanate compound required as well as with respect to the amount of catalyst required in order to enable a molded article to be produced having desirable mechanical properties.

Oxymethylene polymers having recurring —$CH_2O$— units are well known. They may be prepared by polymerizing a source of oxymethylene units, such as anhydrous formaldehyde or trioxane, a cyclic trimer of formaldehyde. High molecular weight solid polyoxymethylenes have been prepared by polymerizing trioxane in the presence of cationic polymerization catalysts, including such compounds as boron trifluoride, antimony trifluoride, antimony fluoroborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride, thinoyl chloride, fluorosulfonic acid, phosphorous trichloride, titanium tetrachloride, ferric chloride, zirconium tetrachloride, aluminum trichloride, stannic chloride, stannous chloride and the alkane sulfonic acids, e.g., ethane sulfonic acid and methane sulfonic acid.

The preferred catalysts are boron fluoride and the boron fluoride complexes with water (such as boron fluoride monohydrate, boron-fluoride dihydrate, and boron fluoride trihydrate), and boron fluoride coordinate complexes with organic compounds, particularly those in which oxygen or sulfur is the donor atom. The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether, is the preferred coordinate complex. The boron fluoride complexes with phenol and with acetic acid are also very effective. Other specific boron fluoride complexes, for example, are the complexes with ethanol, methanol, propanol, butanol, methyl acetate, ethyl acetate, phenyl acetate, benzoic acid, acetic anhydride, acetone, methyl ethyl ketone, dimethyl ether, methyl phenyl ether, acetaldehyde, chloral, dimethyl sulfate, and ethyl mercaptan.

Suitable catalysts are disclosed in U.S. Pat. Nos. 2,989,505; 2,989,506; 2,989,507; 2,989,508; and 2,989,509, all of Donald E. Hudgin and Frank M. Berardinelli; 2,989,510 of Georgee J. Bruni; 2,989,511 of Arthur W. Schnizer, and in the article by Kern et al in *Angewandte Chemie* 73, pp 176-186 (March 21, 1961), all herein incorporated by reference.

Oxymethylene polymers of improved thermal stability may be prepared by introducing into the polymer chains, or attaching to the ends of the polymer chains, structures which are resistant to thermal detachment. The polymers may include interspersed oxyalkylene units with adjacent carbon atoms and preferably oxyethylene units as disclosed in U.S. Pat. No. 3,027,352 of Walling et al. Copolymers of this type may comprise (—$CH_2O$—) units (usually at least 85 mole percent) interspersed with (—OR—) units wherein R is a divalent radical containing at least two carbon atoms directly linked to each other and positioned in the chain between the two valences, with any substituent in the R radical being inert. Suitable substituents include but are not limited to hydrogen, lower alkyl and halogen-substituted lower alkyl and mixtures thereof.

Specific interspersed monomeric units which may be incorporated are those derived from lactones, carbonates, cyclic acid anhydrides or ethylenically-unsaturated compounds, such as styrene, divinyl ether, vinyl acetate, vinyl methyl ketone or acrolein, as disclosed in the aforementioned article by Kern et al. The polymer may be end-capped as, for example, by acylation or etherification after polymerization or during polymerization by the use of selected chain transfer agents.

Oxymethylene copolymers and terpolymers with such oxacylic or oxo-functional compounds, as cyclic ethers having at least two cyclic ether rings, dialdehydes and diketones, have also been prepared, as described in, e.g., French Pat. No. 1,345,218.

As used in the specification and claims, the term "oxymethylene polymers" denotes homopolymers and copolymers (including terpolymers, etc.) having at least 60 percent recurring oxymethylene units, and further includes substituted oxymethylene polymers, wherein the substituents are inert; i.e., do not participate in undesirable side reactions.

A preferred group of polymers intended to be utilized in accordance with this invention are oxymethylene-cyclic ether copolymers having a structure comprising recurring units having the formula

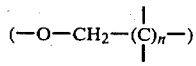

wherein n is an integer from zero to 5 and wherein n is zero in from 60 to 99.6 (e.g., 85 to 99.6) percent of the recurring units.

Suitable oxymethylene copolymers have repeating units which consist essentially of (a) —OCH$_2$— groups interspersed with (b) groups represented by the general formula:

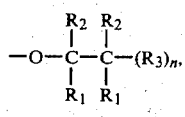

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted oxymethylene radicals, and n is an integer from zero to 3 inclusive.

A preferred class of copolymers are those having a structure comprising recurring units having the formula (—O—CH$_2$—(CH$_2$)$_n$—) wherein n is an integer from zero to 2 and wherein n is zero in from 60 to 99.6 percent of the recurring units. These copolymers are prepared by copolymerizing trioxane with a cyclic ether having the structure

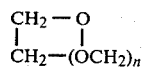

where n is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom. The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordination complex of boron fluoride should be present in the polymerization zone in amounts such that its boron fluoride content is between about 0.0001 and about 1.0 percent by weight based on the weight of the monomers in the polymerization zone. Preferably, amounts between about 0.003 and about 0.03 percent by weight should be used in a continuous process.

The preferred catalyst used in preparing the oxymethylene copolymer is the aforementioned boron trifluoride as discussed in U.S. Pat. No. 3,027,352 issued to Walling et al, herein incorporated by reference. Reference may be made to this patent for further information concerning the polymerization conditions, amount of catalyst employed, etc.

The monomers in the reaction zone are preferably anhydrous or substantially anhydrous. Small amounts of moisture, such as may be present in commercial grade reactants or which may be introduced by contact with atmospheric air, will not prevent polymerization but should be essentially removed for optimum yields.

In a specific embodiment of this invention, the trioxane, cyclic ether and catalyst are dissolved in a common anhydrous solvent, such as cyclohexane and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres or greater may be used, although atmospheric pressure is preferred.

It has been found that the relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mole ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and a oxyethylene group. The incorporation thereof into the copolymer molecule introduces oxyethylene groups into the polymer molecule.

In general, the cyclic ether is present in the reaction mixture in the amount between about 0.2 and about 30 mole percent, based on the total moles of monomer.

The optimum proportion will depend on the particular copolymer desired, the expected degree of conversion and the chemical constitution of the cyclic ether used.

The copolymer produced from the preferred cyclic ethers in accordance with this invention have a structure substantially comp ised of oxymethylene and oxyethylene groups in a ratio from about 1000:1 to about 6:1, preferably 250:1 to 1.5:1.

Upon completion of the polymerization reaction, it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Pat. No. 2,989,509 of Hudgin et al. A preferred oxymethylene copolymer is commercially available from the Celanese Corporation under the designation Celcon ® acetal copolymer.

The oxymethylene copolymers that are preferred for use in the present invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene copolymer component preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in commonly-assigned U.S. Pat. No. 3,219,623 issued to Berardinelli, herein incorporated by reference.

If desired, the oxymethylene copolymer may be end-capped by techniques known to those skilled in the art. A preferred end-capping technique is accomplished by acetylation with acetic anhydride in the presence of sodium acetate catalyst.

During the molding process, oxymethylene polymers are generally heated to temperatures between about 180° and 220° C. for relatively short periods of time such as between about 3 and about 10 minutes. Unless the thermal degradation rate of the polymer has been reduced to a desirably low level, it has been found that molded products have uneven surface characteristics due to gassing and the fact that the molding operation produces substantial amounts of formaldehyde gas, which constitutes an industrial hazard. In order to ameliorate this defect and reduce the degradation to a desirable level, chemical stabilizers are added to oxymethylene polymers.

It is known that the physical properties of oxymethylene polymers can also be enhanced by the addition of reinforcing glass strands, such as chopped glass fibers. In so doing, the tensile strength, flex strength and modulus are increased and the thermal coefficient of expansion of the polymer is reduced. Unfortunately, the addition of glass fibers has had an undesirable effect on thermal stability and impact strength, thus limiting to a certain degree the use to which the thus-filled oxymethylene polymers might be put.

It has been previously determined that the incorporation of both an isocyanate compound (blocked or unblocked) and glass fibers in oxymethylene polymers of the type contemplated herein has an advantageous effect on the physical properties of the polymers. An isocyanate catalyst may optionally be incorporated. Specifically, tensile strength, flex strength and impact strength are enhanced. Insofar as tensile strength and flex strength are concerned, the cooperative (i.e., coupling) effect of the isocyanate and glass fibers in the polymer is such that the total effect of these is greater than the sum of the two effects taken independently. See, for example, commonly-assigned U.S. Pat. No. 3,455,867, issued to Berardinelli et al, herein incorporated by reference.

It has been surprisingly and unexpectedly discovered, however, that additional advantages can be obtained if an isocyanate catalyst system is employed comprised of dibutyl tin dilaurate and at least one alkyl dimethyl benzyl ammonium saccharinate (as herein defined) in conjunction with an isocyanate compound (blocked or unblocked). Specifically, the use of such a catalyst system not only serves to "unblock" any blocked isocyanate compound which may be employed in the molding composition so that it may serve to couple the glass fibers to the oxymethylene polymer, but also serves to enhance the coupling effect such that lessened amounts of the isocyanate compound are required to achieve desirable mechanical properties in the molded composite. In addition, the use of the combination as opposed to the use of the individual catalyst components separately has been found to be advantageous in that the total amount of catalyst employed can be reduced. As a result, a molding composition can be provided which contains fewer extraneous components which may serve as contaminants or diluents.

Preferably, the alkyl dimethyl benzyl ammonium saccharinates employed in the present invention comprise those saccharinates wherein the alkyl is selected from the group consisting of $C_{12}$–$C_{18}$ or mixtures thereof, and preferably from $C_{12}$, $C_{14}$ and $C_{16}$. While such saccharinates may be present in various proportions if more than one is employed, it is preferred that the dodecane, tetradecane and hexadecane saccharinates (if employed) be present in weight ratios of about 4:5:1, respectively. The preparation of said alkyl dimethyl benzyl ammonium saccharinates is disclosed in U.S. Pat. No. 2,725,326, herein incorporated by reference.

The catalyst composition may be employed in varying amounts ranging from about 0.15 to 2.5 percent by weight, based on the weight of the isocyanate compound. Preferably, the catalyst composition is employed in an amount varying from about 0.2 to 2.0 percent by weight of the isocyanate compound. Individually, the respective components of the catalyst composition are generally employed in weight ratios ranging from about 0.1:1.0 to 1.0:1.0, and preferably from about 0.2:1.0 to 0.7:1.0, based on the amounts of dibutyl tin dilaurate and total amounts of the alkyl dimethyl benzyl ammonium saccharinates present, respectively.

The isocyanate compound which is employed in the molding composition of the present invention may be either totally blocked or unblocked, or partially blocked, although it is preferable for the isocyanate to be at least partially blocked to reduce potential pollution problems. The benefits of the present invention can be achieved even though the isocyanate may be unblocked since lessened amounts of the isocyanate may be employed in the composition.

When isocyanate compounds containing two or more isocyanate groups are used, they may be either aromatic or aliphatic in nature. Suitable isocyanates include toluene-2,4-diisocyanate, p-phenylene diisocyanate and 4,4'-diphenyl methanediisocyanate. Alphatic diisocyanates, such as hexamethylene diisocyanate, may also be used. Triisocyanates, such as 4,4'-triphenyl methane triisocyanate and the reaction product of trimethylolpropane and 2,4-toluene diisocyanate in a 1:3 mole ratio, are also suitable.

Other suitable isocyanates include 2,6-toluene diisocyanate; 1,6-toluene diisocyanate; diphenyl methane 4,4'-diisocyanate; 3,3'-dimethyl diphenyl methane 4,4'-diisocyanate; 3,3'-dimethyl-4,4'-diphenylene diisocyanate; 3,3'-bitoluene-4,4'-diisocyanate; o,m,p-phenylene diisocyanate; methane diisocyanate; chlorophenylene-2,4-diisocyanate; chlorophenylene-2,4-toluene diisocyanate; 3,3'-dichlorodiphenyl-4,4'-diisocyanate; 4-chloro-1,3-phenylene diisocyanate; xylene-1,4-diisocyanate; diphenyl methane-4,4'-diisocyanate; 1,5-naphthalene diisocyanate; 1,4-naphthalene diisocyanate and the corresponding diisothiocyanates and the isocyanateisothiocyanates; alkylene diisocyanates, such as 1,6-hexamethylene diisocyanate; 1,2-ethylene diisocyanate; 1,3-propylene diisocyanate; 1,4-tetramethylene diisocyanate; 1,5-pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanateisothiocyanates; cycloaliphatic diisocyanates, such as 1,3-cyclohexylene diisocyanates; 1,3-cyclopentylene diisocyanate; 1,4-cyclohexylene diisocyanate, 4,4'-methylenebis-(cyclohexyl isocyanate) and the corresponding diisothiocyanates and isocyanateisothiocyanates; triisocyanates, such as triphenyl methane triisocyanate; 1,3,5-benzene triisocyanate, and the corresponding isothiocyanates and isocyanate-isothiocyanates. Mixtures of any of the aforementioned compounds, such as mixtures of the 2,4 and 2,6 isomers of toluene diisocyanate, may also be desirable in certain applications.

Aromatic diisocyanates, especially derivatives thereof having electronegative substituents, are particularly desirable, due to their increased reactivity. The electronegative substituents, such as, for example, —NO₂, —C≡N, —CHO,

—COOH, —CONH₂,

or —CF₃— groups, apparently assist the polymerization tendency of the isocyano or isothiocyano groups.

Suitable blocking agents include but are not limited to various phenols such as phenol, cresol, xylenol, and thiophenol; various alcohols such as methanol, ethanol, butanol, 2-ethylhexanol, cyclohexanol, 2-methoxyethanol and 2-ethoxyethanol; and other active hydrogen-containing compounds such as ethyl acetoacetate and diethyl malonate. Exemplary blocked isocyanates include aliphatic polyisocyanates such as a cyclohexylene diisocyanate polyol urethane which can be blocked with an aliphatic alcohol such as methanol or an aromatic hydroxyl-containing compound such as phenol or other compound which contains active hydrogen capable of reversible reaction with the isocyanate such as caprolactam; an aliphatic isocyanate such as cyclohexylene diisocyanate which can be blocked as noted above; and an aromatic polyisocyanate such as a toluene diisocyanate polyol urethane or an aromatic isocyanate such as toluene diisocyanate which can be blocked as noted above. Blocked isocyanates and their method of preparation are well-known and will not be discussed in greater detail herein.

While the amount of isocyanate incorporated into the polymer depends to a certain degree upon the specific isocyanate used, a proportion of between about 0.25 and about 1.5 percent by weight and preferably between about 0.25 and about 0.75 percent by weight (based upon the weight of the polymer) enables the objects of the present invention to be achieved.

The glass fibers may be present in substantial amounts. For example, desirable results may be achieved when blending equal weights of the oxymethylene polymer and the glass fibers. By the same token, desirable results are achieved when using as little as 10 percent by weight of glass fibers, based upon the total weight of the composition. This is particularly true when using chopped glass fibers in, say, the one-sixteenth inch to one-half inch size range. Generally, however, the glass fibers are employed in amounts ranging from about 15 to 40 percent by weight, and preferably from about 20 to 30 percent by weight, based on the weight of the composition.

The oxymethylene polymers of the present invention have many uses since they possess rheological properties which are suitable for commercial molding or forming operations, e.g., injection molding, compression molding, blow molding, rotational casting, etc., including maintenance of structural integrity over varied molding temperature ranges (e.g., absence of voids, thermal stability, etc.)

As indicated hereinabove, the oxymethylene polymer of the present invention preferably comprises oxymethylene (—CH₂O—) units (usually at least 85 mole percent) interspersed with up to about 15 mole percent of (—OR—) units, wherein R is a divalent radical containing at least two carbon atoms directly linked to each other and positioned in the chain between the two valences, with any substituent in the R radical being inert. Suitable such copolymers may have a number average molecular weight of from about 1000 up to about 80,000 or higher, with inherent viscosities ranging from about 0.2 to about 1.5 or higher. Dependent upon the type and extent of property modification sought, the low molecular weight species (e.g., 1000 to 10,000), the high molecular weight species (e.g., 30,000 to 80,000) or any mixture thereof may be employed. The preferred copolymers are disclosed in U.S. Pat. No. 3,027,352 of Walling et al, incorporated herein by reference.

Moldable oxymethylene polymers having branched chains (said chains comprising a plurality of branches of successively recurring oxymethylene units) may also be employed to advantage in the practice of the present invention, and may be preferred for certain applications. Such polymers may be prepared by copolymerizing trioxane with a small amount of a chain branching agent, the small amount being sufficient to link some primary oxymethylene chains to provide a branched structure but insufficient to make the polymer intractable. Primary chains are linear chains comprising successively recurring oxymethylene units and are the chains which would be produced if the chain branching agent were omitted from the system. The amount of chain branching agent used is generally not more than that required to provide one link to another chain for each primary chain in the system.

Suitable chain branching agents, depending on the particular circumstances involved, include those having at least two functional oxygen groups including (1) cyclic ethers having at least two cyclic ether rings, such as 2,2-(trimethylene)bis-1,3-dioxolane, and particularly those compounds having (a) at least two epoxy rings, such as polyepoxides, including diepoxides, triepoxides, etc., (b) at least two formal rings, such as pentaerythritol diformal, and (c) at least one epoxy ring and at least one formal ring, such as monocrotylidene trimethyloethane monoepoxide; and (2) compounds having at least two oxo groups, such as dialdehydes and diketones, such as glutaraldehyde, terephthaldehyde and acrolein dimer.

Suitable polyepoxides include those which may be prepared by the epoxidation of compounds having two or more olefinic linkages. Diepoxides of diolefins are usually used and the epoxidized olefinic bonds may be of aliphatic or cycloaliphatic structures. Particular diepoxides which may be used include butadiene dioxide, vinyl cyclohexene dioxide (1-epoxyethyl-3,4-epoxycyclohexane), limonene dioxide, resorcinol diglycidyl ether, butane diol diglycidyl ether, bis-epoxydicyclopentyl ether of ethylene glycol, dicyclopentadiene dioxide and dicrotilidene pentaerythritol diepoxide. Suitable triepoxides include triglycidyl trimethylpropane prepared by reacting the triallyl ether of trimethylolpropane in a solvent with peracetic acid at a temperature of 0° to 75° C. Suitable polyepoxides include a polyepoxy glyceryl ester containing an average of 5.5 epoxy groups per molecule.

The chain branching agents are usually copolymerized with the trioxane in proportions from about 0.01 to about 7 weight percent, preferably less than about 1 percent by weight, and most preferably from about 0.05 to about 0.80 percent by weight of the chain branching agent based on the weight of trioxane.

The most preferred polymers are terpolymers of trioxane, a chain branching agent as described above, and a bifunctional compound. Preferred bifunctional compounds include (1) those having at least two functional groups, (2) those having at least one unsaturated bond, (3) at least one openable ring structure and (4) combinations of to or more of (1), (2) and (3). Specific bifunctional materials include those disclosed in U.S. Pat. No. 3,027,352 and the Kern et al article. In accordance with a preferred embodiment, the bifunctional compounds provide —O—R— units interspersed among the oxymethylene groups wherein R is a divalent radical containing at least two carbon atoms directly linked to each other and positioned in the chain between the two valences, with any substituents, e.g., hydrocarbons, halohydrocarbons, being inert, e.g., with respect to formaldehyde under the conditions of polymerization.

Preferred terpolymers have chains containing (1) oxymethylene groups interspersed with (2) oxyalkylene groups with adjacent carbon atoms derived from the bifunctional compounds (preferably cyclic ethers having adjacent carbon atoms) and (3) oxyalkylene groups having carbon atoms linked to other chains, the last named groups being derived from the chain branching agents.

Particularly preferred terpolymers are those wherein the oxyalkylene groups with adjacent carbon atoms are cyclic ethers containing oxyethylene groups, such as ethylene oxide and 1,3-dioxolane.

Other specific cyclic ethers having adjacent carbon atoms which may be used are 1,3,5-trioxepane, 1,3-dioxane, trimethylene oxide, pentamethylene oxide, 1,2-propylene oxide, 1,2-butylene oxide, neopentyl formal, tetrahydrofurane and butadiene monoxide. Because of the fact that the inclusion of the chain branching agent produces polymers of lower melt index, terpolymers containing relatively high proportions of such cyclic ethers with adjacent carbon atoms, e.g., about 10 weight percent, are substantially improved over comparable copolymers containing no chain branching agent.

In the preferred terpolymers there is generally from about 75 to about 99.5 percent by weight of recurring oxymethylene units, from about 0.5 to about 25 percent by weight of recurring units derived from the bifunctional compound (such as a cyclic ether with adjacent carbon atoms) and from about 0.01 to about 7 weight percent of units derived from the chain branching agent. The most preferred terpolymers have from about 96.1 to 97.9 percent by weight of oxymethylene units and less than about 1 percent by weight, preferably between about 0.05 to 0.08 percent by weight, of units from the chain branching agent.

While the isocyanate compound, glass fibers and catalyst system may be incorporated into the oxymethylene polymer in various ways, excellent results are achieved by merely melting the oxymethylene polymer at, e.g., 180° C. and gradually milling in the glass fibers, blocked isocyanate compound and catalyst components. The sequence of addition is not critical. According to one embodiment, the oxymethylene polymer is milled on a two-roll mill while in the melt stage and 8-inch chopped glass fibers are milled in for three minutes with the total loading time being about five minutes. Subsequently, a small amount of blocked isocyanate and the catalyst components are milled in for three minutes for a total loading time of about 1.5 minutes.

Obviously, this sequence may be reversed and the desirable properties achieved as described hereinabove. If desired, the isocyanate and catalyst components may be incorporated into an oxymethylene polymer which has been prefilled with glass fibers and which is subjected to elevated temperatures to convert it to plastic form, and while in said plastic form is shaped in an operation which includes passage through a constricted orifice. The isocyanate readily blends with the prefilled polymer during the shaping step. According to a still further embodiment, the oxymethylene polymer may be charged in solid particulate state (e.g., as flakes or pellets) together with a suitable isocyanate to a reaction zone maintained at an elevated temperature in a range sufficient to maintain the polymer in melt state during the reaction. Generally, temperatures between about 100° C. and about 275° C. are employed, with the range of about 150° C. to about 250° C. being preferred. In view of the increased viscosity of the preferred oxymethylene terpolymers, slightly higher temperatures are employed. While atmospheric pressures are preferable for ease of operation, lower and higher pressures, e.g., 0 to 1000 p.s.i., are also suitable. While not essential to the reaction, a blanket of inert gas, such as nitrogen, is customarily employed.

Also suitable for compounding the glass, isocyanate and oxymethylene polymer is extrusion. Temperatures indicated above may be employed and single and twin screw equipment are applicable. All components can be added at the extruder throat or glass fibers can be added via a sidearm feeder. The product may be die face pelletized or strand pelletized.

As suggested hereinabove, the process of the present invention may be conducted in any suitable blending apparatus. For example, incorporation of the additives into the polyoxymethylene polymer may be carried out in a roll mill apparatus having oppositely rotating hollow cylindrical rolls of, e.g., 12-inch diameter, driven at a speed in the range of 20 to 40 revolutions per minute, and steam heated to a temperature in the range of 165° C. to about 195° C. The cylindrical rolls have a variable clearance ranging down to a few thousandths of an inch, which clearance is varied during the course of the milling.

The invention is additionally illustrated in connection with the following Examples which are to be considered as illustrative of the present invention. It should be understood, however that the invention is not limited to the specific details of the Examples.

EXAMPLE 1

Oxymethylene molding compositions were prepared comprised of an oxymethylene molding resin marketed by Celanese Corporation under the tradename Celcon ® comprised of about 2.0 percent oxyethylene units and 98.0 percent oxymethylene units, glass fibers in an amount of 25 percent by weight, a blocked isocyanate compound in varying proportions as defined below and a catalyst system comprised of dibutyl tin dilaurate and alkyl dimethyl benzyl ammonium saccharinate in varying proportions. The alkyl saccharinate catalyst component employed was comprised of about 40 percent by weight of dodecane ($C_{12}$) dimethyl benzyl ammonium saccharinate, about 50 percent by weight of tetradecane ($C_{14}$) dimethyl benzyl ammonium saccharinate and about 10 percent by weight of hexadecane ($C_{16}$) dimethyl benzyl ammonium saccharinate and is avialable from the Onyx Chemical Company under the trademane Onyzide 3300.

The molding composition was formed by extrusion compounding the oxymethylene polymer at 205° C. in a 2.5 inch single-screw extruder together with the catalyst, 3/16 inch chopped glass fibers and a phenol-blocked polyisocyanate compound available from the Mobay Chemical Corporation under the trade name Mondur S. The extruded composition was strand cut and injection molded to form tensile bars which were tested according to ASTM D638. The results of the tests are set forth in Table I below:

TABLE I

| | | Results of Example 1 Tests | | | |
|---|---|---|---|---|---|
| | Isocyanate | Catalyst % By Wt. | | Tensile Strength | Tensile Elongation |
| Sample | % By Wt. | A | B | (psi) | (%) |
| 1 | 1.5 | 0.3 | 0.3 | 15,778 | 2.27 |
| 2 | 1.5 | 0.3 | 1.5 | 15,420 | 2.20 |
| 3 | 1.5 | 1.5 | 0.3 | 14,191 | 2.34 |
| 4 | 1.5 | 1.5 | 1.5 | 13,576 | 1.97 |
| 5 | 0.5 | 0.5 | 0 | 14,755 | 2.60 |
| 6 | 1.5 | 2.0 | 0 | 15,426 | 2.62 |
| 7 | 3.0 | 0.5 | 0 | 17,450 | 3.37 |
| 8 | 3.0 | 2.0 | 0 | 14,896 | 2.14 |
| 9 | 5.0 | 0.5 | 0 | 16,613 | 2.85 |

Note:
Isocyanate wt. % based on weight of oxymethylene polymer.
Catalyst component wt. % based on weight of isocyanate.
Catalyst component A is dibutyl tin dilaurate.
Catalyst component B is the alkyl dimethyl benzyl ammonium saccharinate mixture.

The data of Table I demonstrates that the use of the two catalyst components (i.e., A and B) together in minor amounts enables a molded article to be provided which exhibits mechanical properties comparable to those exhibited by a molded article formed from a composition which include only one of the catalyst components in an amount more than double that required when the combination of catalyst components is employed (compare Samples 1 and 6). In addition, the above test results demonstrate that it is desirable for the dibutyl tin dilaurate catalyst component and the alkyl dimethyl benzyl ammonium saccharinate component to be present in weight ratios of less than 1:1; that is, wherein the dibutyl tin dilaurate is present in the lesser amount (compare Samples 1 and 2 with Sample 3). It is also an advantage of the present invention that the total amount of catalyst employed may be less than about 2.5 percent by weight without sacrificing the mechanical properties of the molded article (compare Samples 1 and 2 with Sample 4). While Samples 6–9 exhibit generally acceptable mechanical properties, they are disadvantageous in that they include large amounts of the isocyanate compound and/or catalyst component.

EXAMPLE 2

The procedure of Example 1 was repeated with a different isocyanate being employed and the amounts thereof varied together with the amount of the catalyst components employed. The isocyanate employed was a phenol-blocked p,p-diphenylmethane diisocyanate available from Uniroyal Chemical Co. under the trade designation P-1. The results of the tests are set forth in Table II below:

TABLE II

| | | Results of Example 2 Tests | | | |
|---|---|---|---|---|---|
| | Isocyanate | Catalyst % By Wt. | | Tensile Strength | Elongation |
| Sample | % By Wt. | A | B | (psi) | (%) |
| 10 | 0.75 | 0.3 | 0.3 | 16,564 | 2.75 |
| 11 | 0.75 | 0.3 | 1.5 | 16,958 | 2.85 |
| 12 | 0.75 | 1.5 | 0.3 | 15,468 | 2.26 |
| 13 | 0.75 | 1.5 | 1.5 | 16,194 | 2.38 |
| 14 | 3.0 | 0.3 | 1.5 | 14,788 | 2.06 |
| 15 | 3.0 | 0.3 | 0.3 | 13,701 | 2.22 |
| 16 | 3.0 | 1.5 | 0.3 | 11,236 | 1.46 |
| 17 | 3.0 | 1.5 | 1.5 | 11,424 | 1.59 |
| 18 | 1.9 | 0.9 | 0.9 | 12,769 | 1.73 |
| 19 | 1.9 | 0.9 | 0 | 12,312 | 1.79 |

Note:
Isocyanate wt. % based on weight of oxymethylene polymer.
Catalyst component wt. % based on weight of isocyanate.
Catalyst A is dibutyl tin dilaurate.
Catalyst B is the alkyl dimethyl benzyl ammonium saccharinate mixture.

The data from Table II demonstrates that use of the combination of the two catalyst components permits lessened amounts of the isocyanate compound to be employed without sacrificing the mechanical properties exhibited by of the molded article and, in fact, enhancing the mechanical properties (compare Samples 10 and 15 and Samples 11 and 14, respectively). Additionally, highly desirable mechanical properties can be obtained by use of less than about 1.5 percent by weight of the isocyanate compound (compare Samples 10 and 11 with Samples 14–19), with less than about 2.5 percent by weight of the catalyst system being required to provide desirable mechanical properties (compare Samples 10 and 11 with Sample 13). The tests also demonstrate that it is desirable for the alkyl dimethyl benzyl ammonium saccharinate catalyst component to be present in an amount at least equal to the amount of dibutyl tin dilaurate which is present (compare Samples 10 and 11 to Sample 12).

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A molding composition comprised of an oxymethylene polymer having at least 60 percent of recurring oxymethylene units, an isocyanate compound in an amount ranging from about 0.25 to 1.5 percent by weight based on the weight of the polymer, a reinforcing agent in the form of glass fibers and a catalyst in an amount ranging from about 0.15 to 2.5 percent by weight based on the weight of the isocyanate, said catalyst comprised of an admixture of dibutyl tin dilaurate and at least one alkyl dimethyl benzyl ammonium saccharinate wherein said alkyl is selected from the group consisting of $C_{12}$–$C_{18}$ and mixtures thereof, with said dibutyl tin dilaurate and said at least one alkyl dimethyl benzyl ammonium saccharinate being present in a weight ratio ranging from about 0.1:1 to 1:1, respectively.

2. The composition of claim 1 wherein said isocyanate is a diisocyanate.

3. The composition of claim 1 wherein said glass fibers are present in an amount ranging from about 15 to 40 percent by weight, based on the weight of the composition.

4. The composition of claim 3 wherein said glass fibers are present in an amount ranging from about 20 to 30 percent by weight.

5. The composition of claim 1 wherein said alkyl dimethyl benzyl ammonium saccharinate comprises an admixture of dodecane dimethyl benzyl ammonium saccharinate, tetradecane dimethyl benzyl ammonium saccharinate and hexadecane dimethyl benzyl ammonium saccharinate.

6. The composition of claim 5 wherein said dodecane dimethyl benzyl ammonium saccharinate, tetradecane dimethyl benzyl ammonium saccharinate and hexadecane dimethyl benzyl ammonium saccharinate are present in weight ratios of about 4:5:1, respectively.

7. The composition of claim 1 wherein said oxymethylene copolymer comprises from about 85 to about 99.6 weight percent of recurring —OCH$_2$— groups interspersed with groups of the formula:

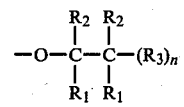

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals and n is an integer from 0 to 3, inclusive.

8. The molding composition of claim 1 wherein said isocyanate comprises a blocked isocyanate.

9. The molding composition of claim 1 wherein said blocked isocyanate is blocked with an aromatic compound.

10. The molding composition of claim 1 wherein said blocked isocyanate is blocked with an aliphatic compound.

11. The molding composition of claim 9 wherein said isocyanate is blocked with a phenol.

12. The molding composition of claim 10 wherein said isocyanate is blocked with an alcohol.

13. The molding composition of claim 1 wherein said dibutyl tin dilaurate and said at least one alkyl dimethyl benzyl ammonium saccharinate are present in a weight ratio ranging from about 0.2:1 to 0.7:1, respectively, based on the weight of the isocyanate.

14. The molding composition of claim 1 wherein said catalyst is present in an amount ranging from about 0.2 to 2.0 percent by weight, based on the weight of the isocyanate.

15. The molding composition of claim 1 wherein said isocyanate compound is present in an amount ranging from about 0.25 to 0.75 percent by weight, based on the weight of the polymer.

* * * * *